US008258461B2

(12) United States Patent
Hsu et al.

(10) Patent No.: US 8,258,461 B2
(45) Date of Patent: Sep. 4, 2012

(54) APPARATUS OF GENERATING AN OPTICAL TWEEZERS WITH MOMENTUM AND METHOD THEREOF AND PHOTO-IMAGE FOR GUIDING PARTICLES

(75) Inventors: Long Hsu, Hsinchu (TW); Cheng-Hsien Liu, Hsinchu (TW); Sheng-Yang Tseng, Hsinchu (TW); William Wang, Taoyuan County (TW); Chung-Cheng Chou, Taoyuan County (TW); Fung-Hsu Wu, Taoyuan County (TW); Chen Peng, Taipei (TW); Ta-Yuan Lee, Taipei County (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 493 days.

(21) Appl. No.: 12/219,871

(22) Filed: Jul. 30, 2008

(65) Prior Publication Data
US 2009/0032692 A1    Feb. 5, 2009

(30) Foreign Application Priority Data
Jul. 31, 2007    (TW) .............................. 96128106 A (51) Int. Cl.
*B01D 21/01*    (2006.01)
(52) U.S. Cl. ........ 250/251; 210/732; 210/800; 210/802; 422/72; 422/82.05; 735/173.1; 436/177
(58) Field of Classification Search .................. 250/251; 210/732, 800, 802, 927; 435/173.1; 436/177; 422/72, 82.05, 101
See application file for complete search history.

(56) References Cited

U.S. PATENT DOCUMENTS

| 6,416,190 | B1 | 7/2002 | Grier et al. | |
| 7,075,060 | B2 * | 7/2006 | Grier et al. | 250/251 |
| 7,118,676 | B2 * | 10/2006 | Mueth et al. | 210/732 |
| 7,227,688 | B2 * | 6/2007 | Grier et al. | 359/566 |
| 7,324,282 | B2 * | 1/2008 | Grier et al. | 359/573 |
| 7,482,577 | B2 * | 1/2009 | Gruber et al. | 250/251 |

FOREIGN PATENT DOCUMENTS

| TW | 531661 B | 5/2003 |
| TW | 200602673 A | 1/2006 |
| WO | WO02056431 A2 | 7/2002 |
| WO | WO2004012133 A2 | 2/2004 |

* cited by examiner

*Primary Examiner* — Kiet T Nguyen (57) ABSTRACT

An apparatus of generating an optical tweezers with momentum and method thereof and an optical tweezers photo-image for guiding particles are provided. The apparatus generates at least one optical tweezers on an examined object that carries at least one particle. The apparatus includes a laser source, a diffractive optical element and a convergent lens. The laser beam from the laser source passes through the diffractive optical element to produce a diffractive pattern. The laser beam is then received by the convergent lens and then to be focused on a plane of the examined object. The optic axis of the convergent lens is substantially not perpendicular to the plane of the examined object, so that the laser beam is projected onto the plane of the examined object in a skewed manner for providing a lateral momentum to move the particle.

15 Claims, 7 Drawing Sheets

APPARATUS OF GENERATING AN OPTICAL TWEEZERS WITH MOMENTUM AND METHOD THEREOF AND PHOTO-IMAGE FOR GUIDING PARTICLES

This application claims the benefit of Taiwan application Serial No. 96128106, filed Jul. 31, 2007, the subject matter of which is incorporated herein by reference.

BACKGROUND OF THE INVENTION

1. Field of the Invention

The invention relates in general to an apparatus of generating an optical tweezers, and more particularly to an apparatus of generating an optical tweezers with momentum.

2. Description of the Related Art

The technology relating to optical tweezers, which captures or controls particles by laser light without mechanically contacting the particles, is currently used in the fields of micro-electrical engineering and bio-medication. When a particle is projected by a laser beam, the particle will move towards the part of the light that has higher intensity, therefore a capturing effect is generated on the particle. With the change in the gradient of the intensity of the laser light, an interaction is generated between the laser light and the particle projected by the laser light. Besides, the movement of many particles in a multi-dimensional space can be controlled at the same time.

The above technology of controlling the movement of particles still relies on the change in the intensity of the light or the patterns of diffractive optical elements to change the gradient of the light projected onto the particles, such that the particles will-move in a linear, deflective or whiripooled manner. However, the movement of particles is controlled by momentum generated by changing the regulator of laser light or adding a fluid or static-electro mechanism.

SUMMARY OF THE INVENTION

The invention is directed to an apparatus of generating an optical tweezers with momentum and method thereof and an optical tweezers photo-image for guiding particles. With the design of an optical path that makes the projection of laser beam skewed, the optical tweezers formed by the laser beam is capable of driving, controlling or sorting particles.

According to a first aspect of the present invention, an apparatus of generating an optical tweezers with momentum on an examined object carrying at least one particle is provided. The apparatus includes a laser source, a diffractive optical element and a convergent lens. A laser beam of the laser source passes through the diffractive optical element to generate a diffractive pattern. The laser beam is then received by the convergent lens and then to be focused on a plane of the examined object. The optic axis of the convergent lens is substantially not perpendicular to the plane of the examined object, so that the laser beam is projected onto the plane of the examined object in a skewed manner for providing a lateral momentum to move the particle.

According to a second aspect of the present invention, a method of generating an optical tweezers with momentum on an examined object carrying at least one particle is provided. The method includes the following steps. Firstly, a laser source, a diffractive optical element and a convergent lens are provided, and the optic axis of the convergent lens is substantially not perpendicular to a plane of the examined object. Next, a laser beam emitted by the laser source passes through the diffractive optical element and then generates a diffractive pattern. Then, the laser beam is received by the convergent lens, and is projected onto the plane of the examined object in a skewed manner for providing a lateral momentum to move the particle.

According to a third aspect of the present invention, an optical tweezers photo-image for guiding at least one particle is provided. The optical tweezers photo-image includes a first photo-image and a second photo-image. The first photo-image has a first end and a second end and approximately extends along a first direction. The first photo-image is for enabling the particle to move towards the second end from the first end of the first photo-image. The second photo-image has a third end and a fourth end and approximately extends along a second direction, wherein the third end neighbors the second end. During the course of moving towards the second end from the first end, when the particle enters the region where the second photo-image is located, the particle will be guided by the second photo-image to move along-the second direction.

The invention will become apparent from the following detailed description of the preferred but non-limiting embodiments. The following description is made with reference to the accompanying drawings.

DETAILED DESCRIPTION OF THE INVENTION

Figure 1A:
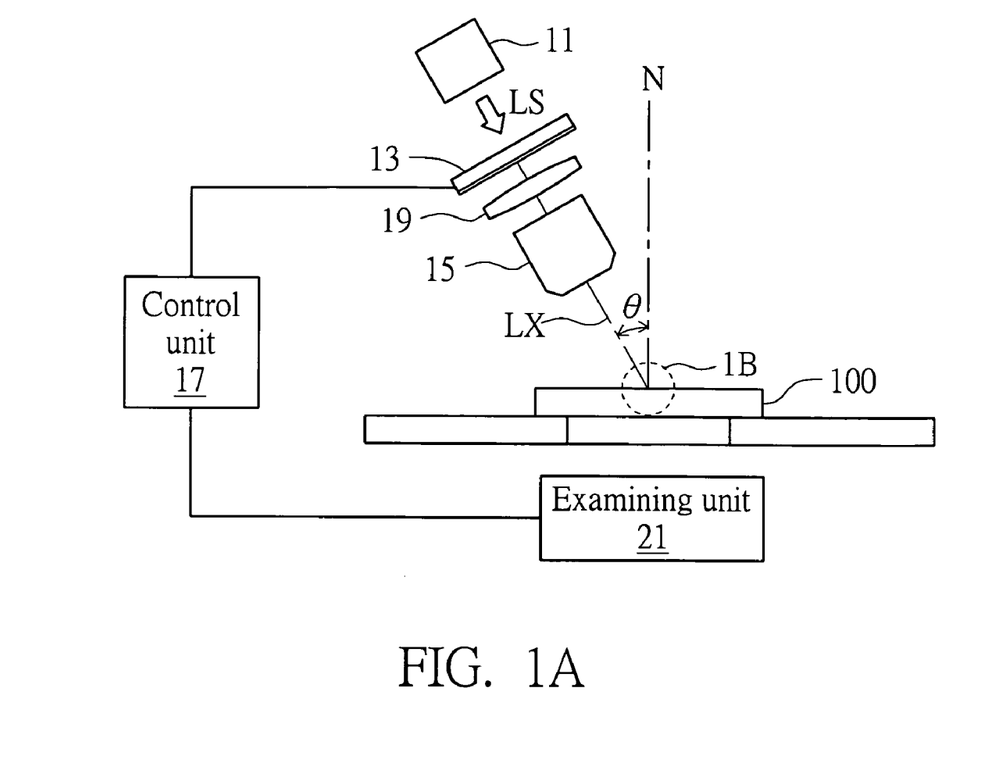
FIG. 1A is a diagram showing an apparatus of generating optical tweezers according to a preferred embodiment of the invention.
Figure 1B:
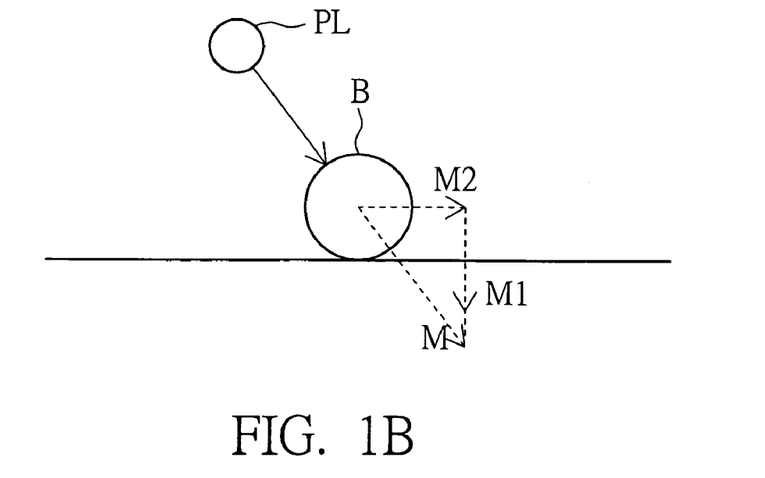
FIG. 1B is a partial enlargement diagram showing an examined object in FIG. 1A.

FIG. 1A is a diagram showing an apparatus of generating optical tweezers according to a preferred embodiment of the invention. FIG. 1B is a partial enlargement diagram showing an examined object in FIG. 1A. As shown in FIG. 1A, the apparatus 1 of generating optical tweezers includes a laser source 11, a diffractive optical element 13 and a convergent lens 15. A laser beam LS emitted by the laser source 11 passes through the diffractive optical element 13 and then generates a diffractive pattern. The laser beam LS passing through the diffractive optical element 13 is received by the convergent lens 15 to be focused on a plane of the examined object 100, which carries at least one particle. The optic axis LX of the convergent lens 15 is substantially not perpendicular to the plane of the examined object 100 so that the laser beam LS is projected onto the plane of the examined object 100 in a skewed manner for providing a lateral momentum to move the particle.

The apparatus 1 further includes a control unit 17, a lens set 19 and an examining unit 21. The lens set 19 is disposed between the diffractive optical element 13 and the convergent lens 15. The examining unit 21 is adjacent to the examined object 100. Preferably, the diffractive optical element 13 is a programmable diffractive optical element. The examining unit 21 includes an image sensor for sensing the examined object 100. The control unit 17 is electrically connected to the diffractive optical element 13 and the image sensor. With the control unit 17, the diffractive optical element 13 and the image sensor being coupled together, the pattern of the diffractive optical element 13 can be adjusted timely in accordance with different characteristics of the examined object 100. Thus, after the laser beam LS passes through the diffractive optical element 13, different diffractive patterns are formed on the examined object 100, thereby changing the light field of the optical tweezers.

With the design of an optical path, which makes the projection of laser beam skewed as shown in FIG. 1B, when a photon PL of the laser beam hits a particle B, the momentum of the photon PL is transmitted to the particle B. The momentum M of the photon PL is the resultant of a vertical momentum M1 and a lateral momentum M2. The lateral momentum M2 along the plane of the particle B enables the particle B to move. The moving direction of the particle B is substantially the direction of the lateral momentum M2. The optic axis LX of the convergent lens 15 forms a contained angle θ with the normal line of the plane of the examined object 100, and the intensity of the lateral momentum M2 is related to the magnitude of the contained angle θ.

Figure 1C:
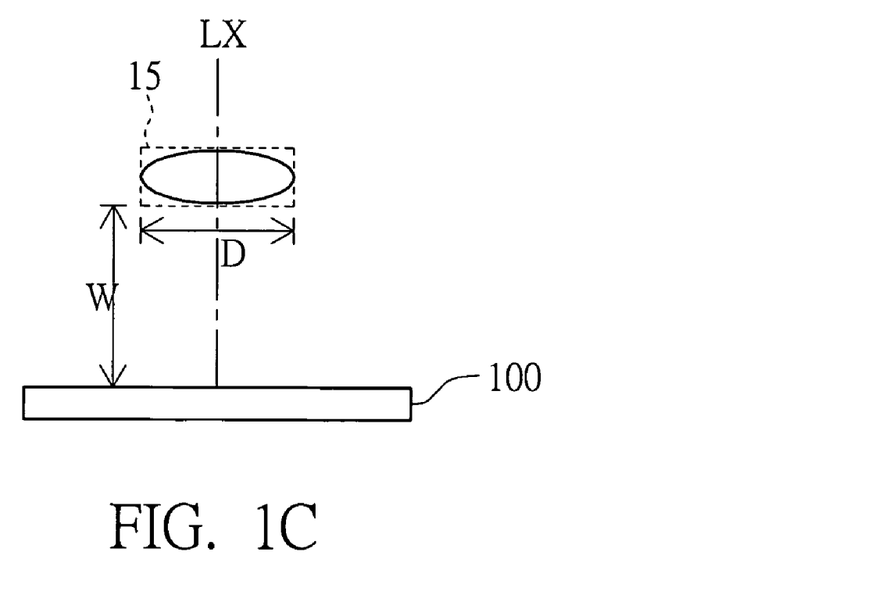
FIGS. 1C and 1D are diagrams showing different relationships between the convergent lens and the examined object.
Figure 1D:
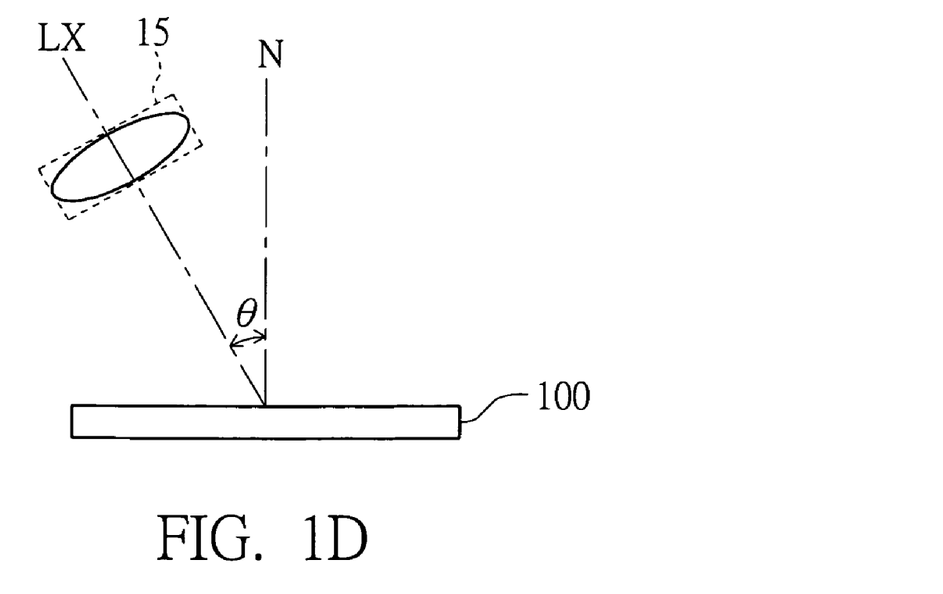

FIGS. 1C and 1D are diagrams showing different relationships between the convergent lens and the examined object 100. The contained angle θ is determined according to the size or the diameter D of the convergent lens 15 and the working distance W of the convergent lens 15, wherein the maximum angle $\theta_{max}$ of the contained angle θ is equal to Arc Tan[D/(2W)]. Due to the contained angle θ, the lateral momentum M2 on the plane of the examined object 100 increases as the value of Sin θ increases. As such, the larger the contained angle θ is provided, the greater the lateral momentum M2 is generated.

Figure 2:
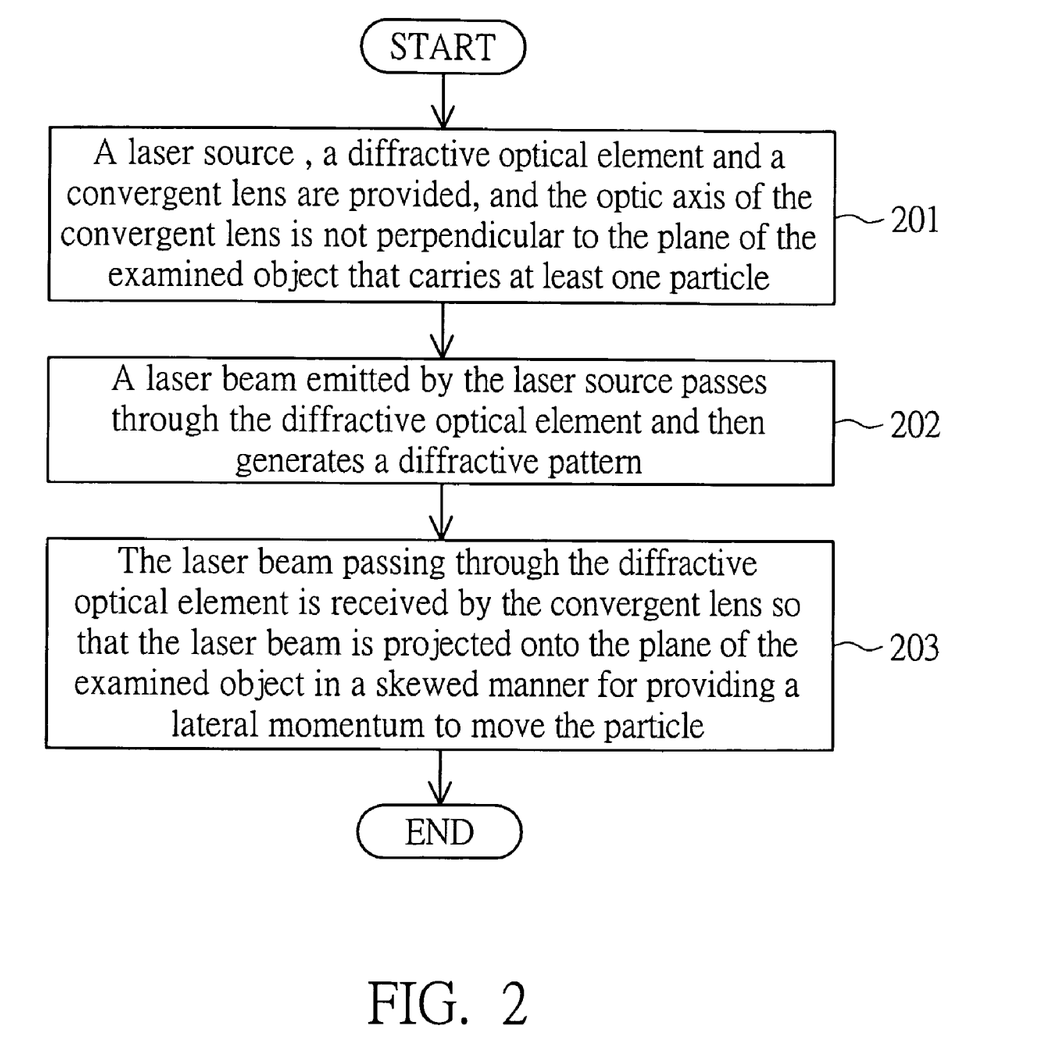
FIG. 2 is a flowchart of a method of generating an optical tweezers with momentum according to a preferred embodiment of the invention.

FIG. 2 is a flowchart of a method of generating an optical tweezers with momentum according to a preferred embodiment of the invention. The method includes steps 201 to 203. Firstly, in step 201, a laser source 11, a diffractive optical element 13 and a convergent lens 15 are provided, and the optic axis LX of the convergent lens 15 is not perpendicular to the plane of the examined object 100 that carries at least one particle. Next, as shown in step 202, a laser beam LS emitted by the laser source 11 passes through the diffractive optical element 13 and then generates a diffractive pattern. Then, in step 203, the laser beam LS passing through the diffractive optical element 13 is received by the convergent lens 15 so that the laser beam LS is projected onto the plane of the examined object 100 in a skewed manner for providing a lateral momentum to move the particle.

The laser source 11, the diffractive optical element 13, the lens set 19 and the convergent lens 15 form an optical path unit, for example. The optical guide lines of the optical tweezers generated by the optical path unit function on the examined object 100 to form an optical tweezers photo-image for guiding the particle to move. The examined object 100 is, for example, a microfludic chip. A plurality of particle storage recesses having different functions are formed on the microfludic chip. The particle storage recesses include, for example, starting regions, observing regions and the terminal regions. Different storage recesses are connected by the guide lines of the optical tweezers for driving or controlling the movement of particles.

The control unit 17 can drive the diffractive optical element 13 to change its pattern, enabling the laser beam LS to generate different diffractive patterns after passing through the diffractive optical element 13. The diffractive patterns of the laser beam LS are, for example, different linear photo-images, which are optical guide lines on the examined object. The guide lines of optical tweezers can be changed according to the design of the diffractive optical element 13. The mechanism of making use of a plurality of photo-images on the examined object to sort particles is elaborated below.

Figure 3A:
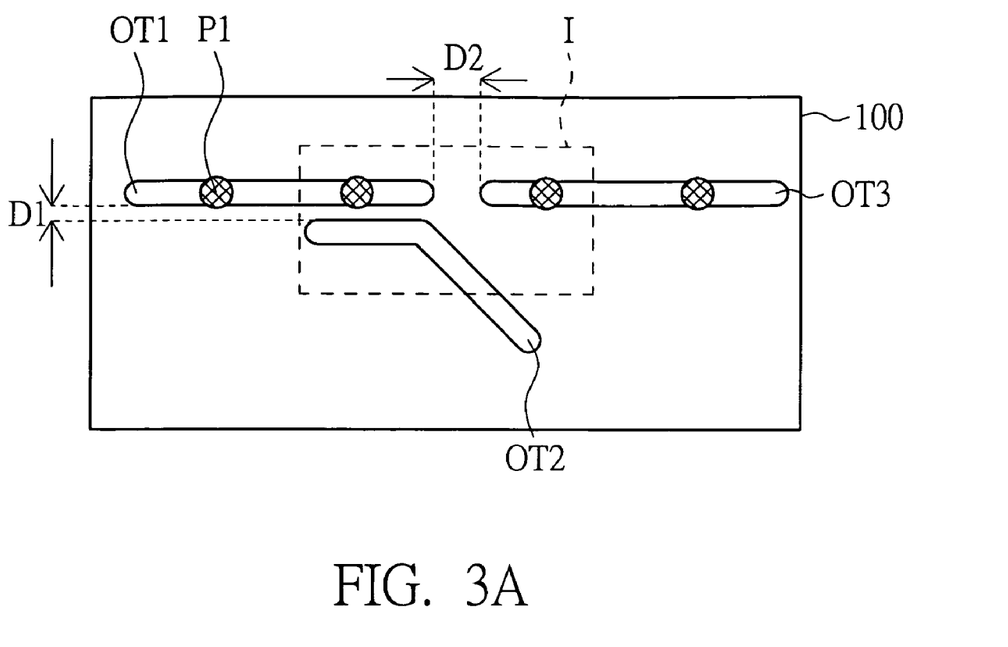
FIGS. 3A and 3B are diagrams showing an examined object with three photo-images.
Figure 3B:
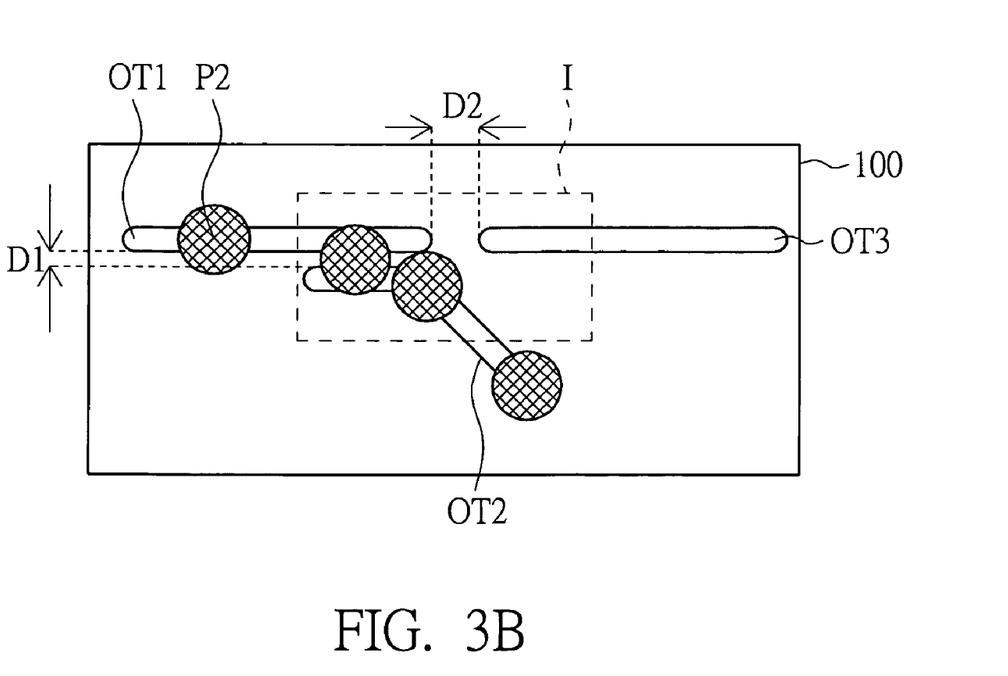

FIGS. 3A and 3B are diagrams showing an examined object with three photo-images. The examined object 100 has photo-images OT1 to OT3 in the form of guide lines, wherein the photo-image OT2 is beside the photo-image OT1, and the two photo-images OT1 and OT2 are separated by a distance of D1. The extending direction of a part of the photo-image OT2 is not parallel to the extending direction of the photo-image OT1. The photo-image OT3 is disposed along the extending direction of the photo-image OT1 and separated by a distance of D2 from the photo-image OT1. The examined object 100 has an isolating region I in which the photo-images OT1 to OT3 partially congregate. The photo-image OT1 captures particles P1 and P2 of different sizes, wherein the radius of particle P2 is greater than the distance D1. When the particles P1 and P2 enter the isolating region I, the larger particle P2 are projected by the photo-image OT2 and attracted to the location between two parallel lines of the photo-image OT1 and the photo-image OT2, as shown in FIG. 3B. If the light field of the photo-image OT2 has a higher intensity, the particle P2 will be attracted to the light field underneath and captured by the photo-image OT2. As to the particle P1, since the particle P1 has smaller size (the radius of particle P1 is smaller than the distance D1), it is not functioned by the photo-image OT2 within the isolating region I but is captured by the photo-image OT3 at the rear of the photo-image OT1, as shown in FIG. 3A.

In other embodiments, particles of different sizes can be sorted at one time as long as the distribution of the light field is repeated and the distance between the photo-images of the optical tweezers is adjusted according to the size of the to-be-sorted particles. For example, the distance is greater than the radius of smaller particles but smaller than the radius of the particles to be sorted.

Figure 3C:
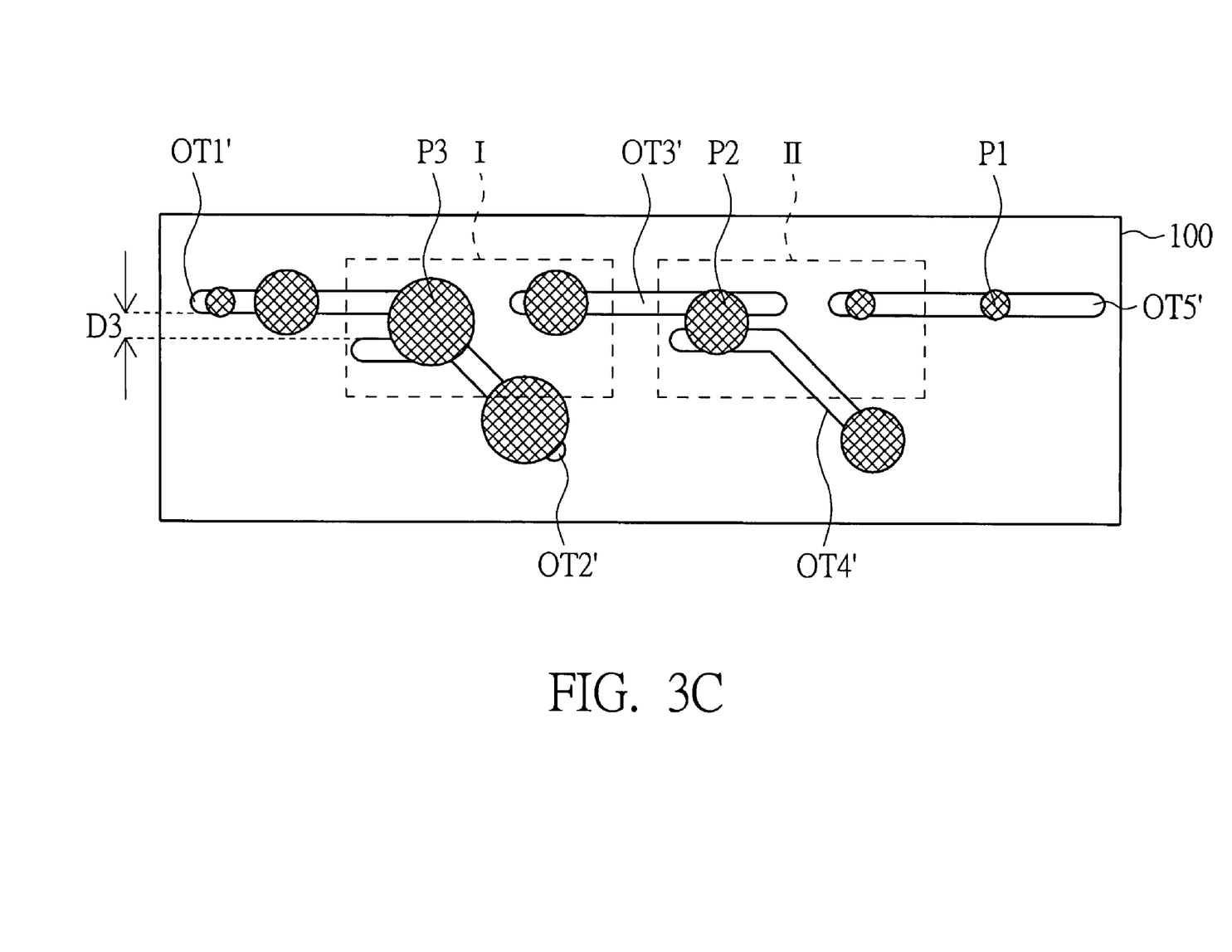
FIG. 3C is a diagram showing an examined object with five photo-images.

FIG. 3C is a diagram showing an examined object with five photo-images. With the design of a diffractive optical element, photo-images OT1' to OT5' are generated on the examined object 100 at the same time. The disposition of the photo-images OT1' to OT3' is the same as that of the photo-images OT1 to OT3 in FIGS. 3A to 3B. As the distance D3 between the photo-images OT1' and OT2' is increased to be greater than the radius of particle P2 but smaller than the radius of the largest particle P3, the particle P3 is thus separated by the photo-image OT2'. The photo-images OT4', OT5' and OT3' partially congregate within the isolating region 11. The photo-image OT4' is used for sorting the second largest particle P2. Since the particle P1 has the smallest size, the particle P1 is not projected by the light field of photo-image OT2' or OT4', so that the particle P1 moves along the photo-images OT1', OT3', and OT5'. Thus, the three particles P3, P2, and P1 of different sizes are sequentially separated.

Figure 3D:
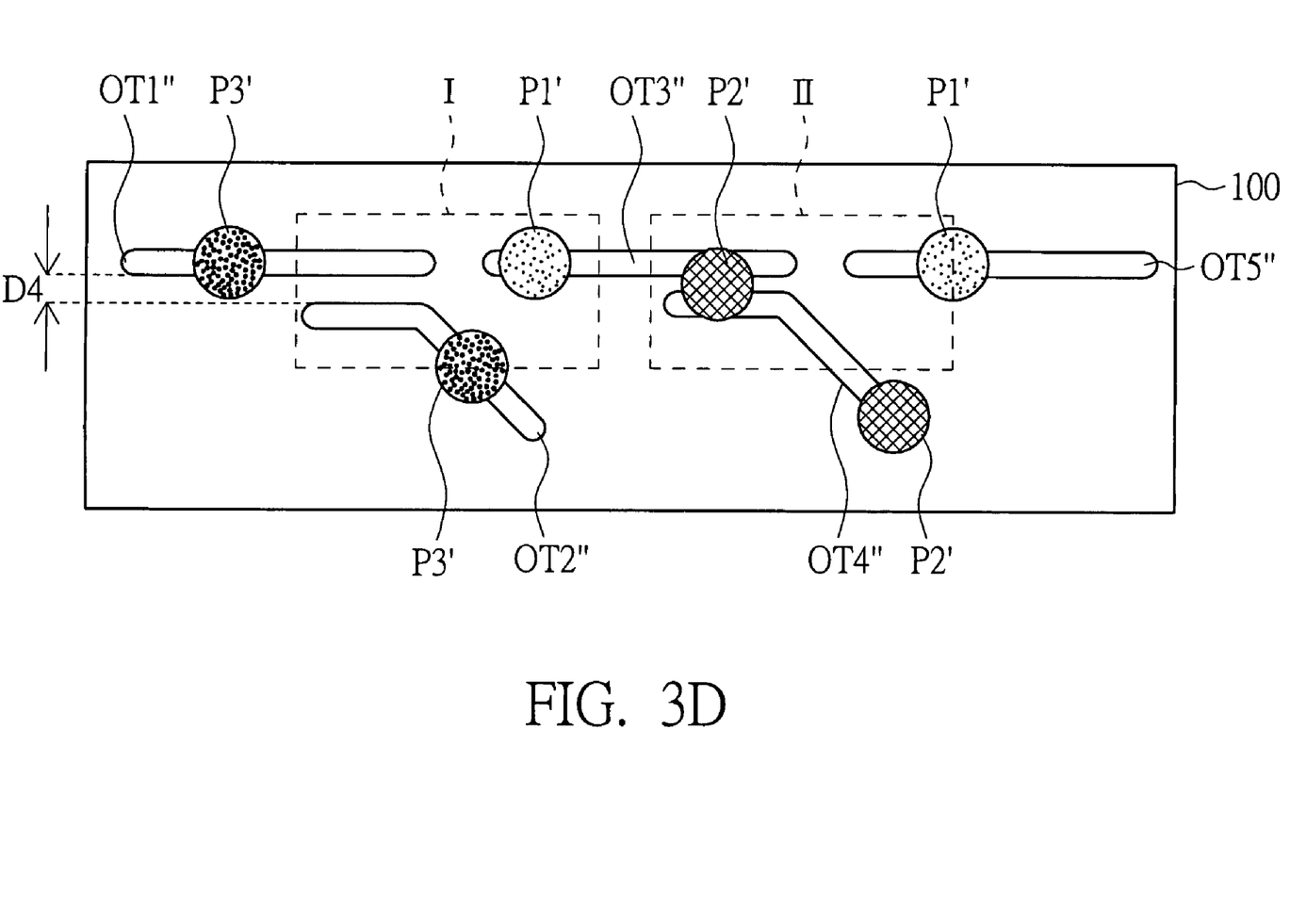
FIG. 3D is a diagram showing an examined object with five photo-images for separating particles of different sizes.

The method for sorting particles of different radiuses disclosed above is also applicable to sorting particles of the same radius. FIG. 3D is a diagram showing an examined object with five photo-images for separating particles of different sizes. The examined object 100 has five photo-images OT1" to OT5" disposed in an arrangement the same as that of the photo-images OT1' to OT5' in FIG. 3C. The distance D4 between the photo-image OT2" (OT4") and the photo-image OT1" (OT3") is determined according to particle-characteristics. Particles P1' to P3' are of the same radius but have different particle characteristics. Whether to sort the particle is determined as long as the examining unit 21 (shown in FIG. 1A) detects the particles P1' to P3'. For example, when the examining unit 21 detects that the particle P3' possesses a first characteristics, the examining unit 21 transmits a signal to the control unit 17, which controls the diffractive optical element 13 so as to generate the photo-image OT2" on the examined object 100. When the particle P3' enters the isolating region I, the particle P3' is then attracted by the photo-image OT2" and moves along the photo-image OT2". Likewise, when the examining unit 21 detects that the particle P2' possesses a second characteristics, the examining unit 21 also transmits a signal to the control unit 17, which controls the diffractive optical element 13, to generate the photo-image OT4" on the examined object 100. When the particle P2' enters the isolating region II, the particle P2' is attracted by the photo-image OT4" and moves along the photo-image OT4". Thus, the particles P3', P2', P1' of the same size are separated according to their particle characteristics.

In the above embodiments, the laser beam is projected onto the examined object in a skewed manner for providing a lateral momentum to move particles. In addition, particles will move towards the part of the light field with highest intensity. Therefore, with the design of skewed laser beam and the distribution of the intensity of the light field, the movements of the particles are further controlled. The intensity of the light field is controlled by the diffractive optical element 13. And, the intensity of the light field of the diffractive pattern generated on the examined object 100 by the laser beam passing through the diffractive optical element 13 is uniformed or non-uniformed. When the intensity of the light field is uniformed, the particle is mainly controlled by the lateral momentum of the skewed laser beam. However, the movement of particle can also be controlled by generating photo-images with non-uniformed intensity of light field on the examined object 100.

Figure 4:
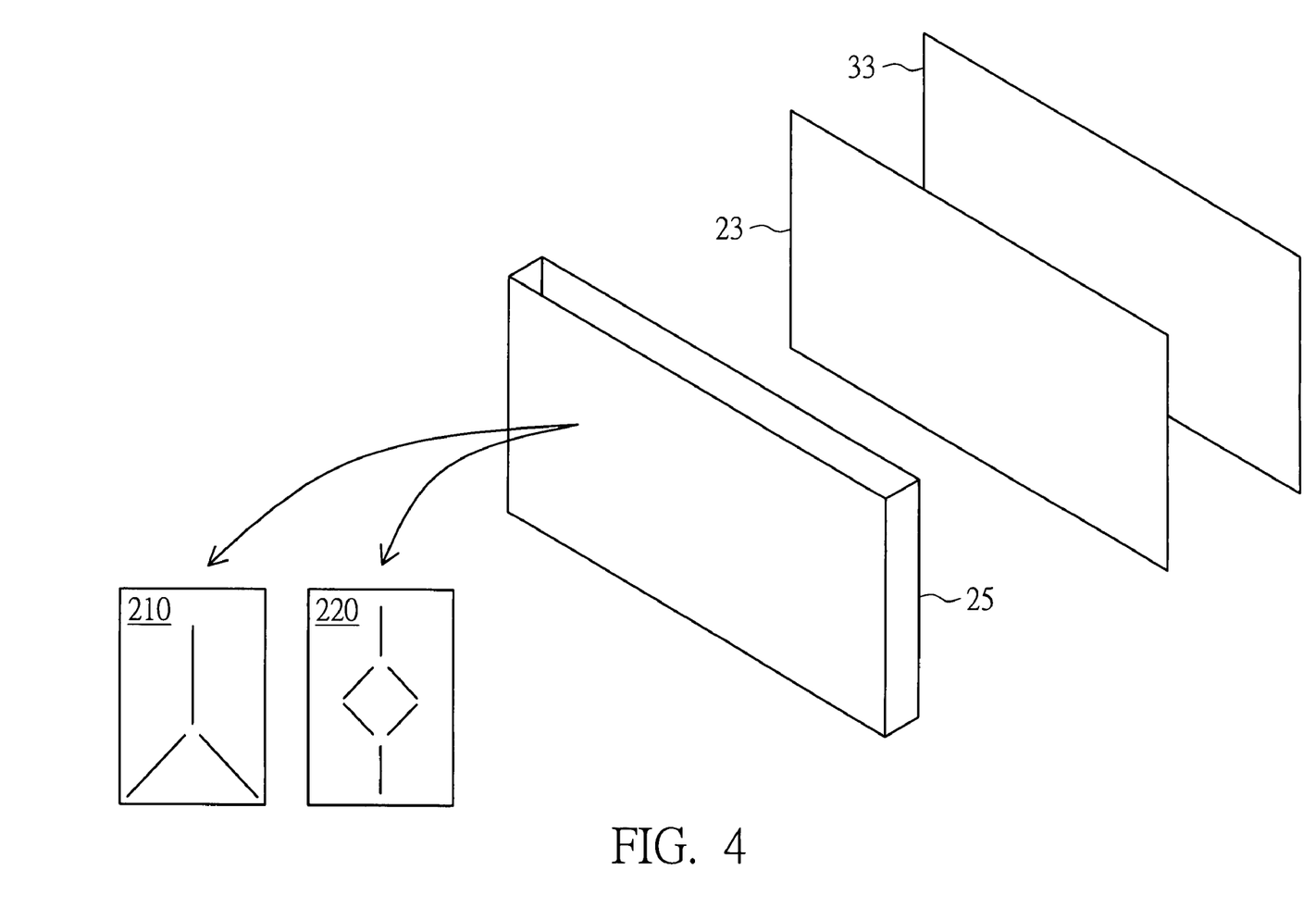
FIG. 4 is diagram showing replaceable diffractive optical elements.

The diffractive optical element 13 of the embodiment is exemplified by a programmable diffractive optical element. In practical application, if the varieties of examined objects reduplicate, the diffractive optical element 13 can be a replaceable diffractive optical element instead. Different diffractive optical elements generate corresponding optical tweezers. FIG. 4 is a diagram showing replaceable diffractive optical elements. The replaceable diffractive optical element 23 inserted into a cartridge 25 generates an optical tweezers with photo-image 210 on the examined object, for example. The diffractive optical element 33 inserted into the cartridge 25 generates an optical tweezers with photo-image 220 on the examined object, for example. Therefore, by replacing the diffractive optical element, different examining elements are provided with better control mode of particle movement, hence saving the cost of the control unit.

The apparatus of generating an optical tweezers with momentum, the method thereof and the photo-images for guiding particles are disclosed in the above embodiments of the invention. With an optical path producing a skewed projection, a lateral momentum is provided for controlling particles. Therefore, particles can be driven or separated without applying an external force or changing the intensity of light. Moreover, the pattern of diffractive optical element is designed according to the environment or the examined object. The pattern of the diffractive optical element can be designed in advance or the diffractive optical element is controlled by the control unit. Since the control unit can be linked to an examining unit, an instant feedback control can be provided according to the capture of particles by optical tweezers, and further change the pattern of the diffractive optical element. Thus, the application of optical tweezers is made more effective.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus of generating an optical tweezers on an examined object carrying a plurality of particles, comprising:
   a laser source for emitting a laser beam;
   a diffractive optical element, wherein the laser beam passes through the diffractive optical element to produce a diffractive pattern; and
   a convergent lens for receiving the laser beam from the diffractive optical element to focus the laser beam on a plane of the examined object so as to form a first photo-image, a second photo-image and a third photo-image on the plane, wherein the optic axis of the convergent lens is substantially not perpendicular to the plane of the examined object such that the laser beam is projected onto the plane of the examined object in a skewed manner for providing a lateral momentum to move the particles so as to sort the particles by different sizes, wherein when the particles enter an isolating region of the first photo-image, the particles of first size are projected by the second photo-image and attracted to a light filed along the second photo-image, and the particles of second size are projected by the third photo-image and attracted to another light filed along the third photo-image,
   wherein the second photo-image is separated by a first distance from the first photo-image to sort the particles of first size, the first size is greater than the first distance, and the third photo-image is separated by a second distance from the first photo-image to sort the particles of second size, the second size is smaller than the first distance and greater than the second distance.

2. The apparatus according to claim 1, wherein the particle substantially moves along the direction of the lateral momentum.

3. The apparatus according to claim 1, wherein the optic axis of the convergent lens forms a contained angle with the normal line of the plane of the examined object, and the intensity of the lateral momentum is related to the magnitude of the contained angle.

4. The apparatus according to claim 1, wherein the diffractive pattern is focused on the examined object with a uniformed or non-uniformed intensity.

5. The apparatus according to claim 1, wherein the diffractive optical element is a programmable diffractive optical element.

6. The apparatus according to claim 1, wherein after the diffractive pattern is received by the convergent lens, at least a first optical guide line and a second optical guide line are formed on the examined object, and the second optical guide line is located beside the first optical guide line.

7. The apparatus according to claim 6, wherein an extending direction of the second optical guide line is not parallel to an extending direction of the first optical guide line.

8. A method of generating an optical tweezers with momentum on an examined object carrying a plurality of particles, comprising:

providing a laser source, a diffractive optical element and a convergent lens, and the optic axis of the convergent lens is substantially not perpendicular to a plane of the examined object;

emitting a laser beam by the laser source, wherein the laser beam passes through the diffractive optical element to produce a diffractive pattern; and receiving the laser beam passing through the diffractive optical element by the convergent lens so as to form a first photo-image, a second photo-image and a third photo-image on the plane, wherein the laser beam is projected onto a plane of the examined object in a skewed manner for providing a lateral momentum to move the particles so as to sort the particles by different sizes, wherein when the particles enter an isolating region of the first photo-image, the particles of first size are projected by the second photo-image and attracted to a light filed along the second photo-image, and the particles of second size are projected by the third photo-image and attracted to another light filed along the third photo-image, wherein the second photo-image is separated by a first distance from the first photo-image to sort the particles of first size, the first size is greater than the first distance, and the third photo-image is separated by a second distance from the first photo-image to sort the particles of second size, the second size is smaller than the first distance and greater than the second distance.

9. The method according to claim 8, wherein the particle substantially moves along the direction of the lateral momentum.

10. The method according to claim 8, wherein the optic axis of the convergent lens forms a contained angle with the normal line of the plane of the examined object, and the intensity of the lateral momentum is related to magnitude of the contained angle.

11. The method according to claim 8, the diffractive pattern is focused on the examined object with a uniformed or non-uniformed intensity.

12. The method according to claim 8, wherein after the diffractive pattern is received by the convergent lens, at least a first optical guide line and a second optical guide line are formed on the examined object, and the second optical guide line is located beside the first optical guide line.

13. The method according to claim 12, wherein an extending direction of the second optical guide line is not parallel to an extending direction of the first optical guide line.

14. An optical tweezers photo-image for guiding a plurality of particles, comprising:

a first photo-image approximately extending along a first direction and having a first end and a second end, wherein the first photo-image is for enabling the particles to move towards the second end from the first end of the first photo-image;

a second photo-image extending along a second direction and having a third end and a fourth end, wherein the third end adjacent to the second end; and a third photo-image extending along a third direction;

wherein, during the course of moving towards the second end from the first end, the particles enter an isolating region at the second end, the particles of first size are projected by the second photo-image and attracted to a light filed along the second photo-image, and the particles of second size are projected by the third photo-image and attracted to another light filed along the third photo-image, whereby the particles are sorted, wherein the second photo-image is separated by a first distance from the first photo-image to sort the particles of first size, the first size is greater than the first distance, and the third photo-image is separated by a second distance from the first photo-image to sort the particles of second size, the second size is smaller than the first distance and greater than the second distance.

15. The optical tweezers photo-image according to claim 14, wherein the second photo-image is generated only when the particle is detected.

* * * * *